(12) United States Patent
Kwon et al.

(10) Patent No.: US 10,563,734 B2
(45) Date of Patent: Feb. 18, 2020

(54) MULTI-STAGE TRANSMISSION FOR VEHICLE

(71) Applicants: Hyundai Motor Company, Seoul (KR); Kia Motors Corporation, Seoul (KR)

(72) Inventors: Hyun Sik Kwon, Seoul (KR); Seong Wook Hwang, Gyeonggi-do (KR); Ki Tae Kim, Incheon (KR); Won Min Cho, Gyeonggi-do (KR); Jae Chang Kook, Gyeonggi-do (KR); Seong Wook Ji, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 101 days.

(21) Appl. No.: 15/825,694

(22) Filed: Nov. 29, 2017

(65) Prior Publication Data
US 2018/0363732 A1  Dec. 20, 2018

(30) Foreign Application Priority Data
Jun. 15, 2017 (KR) .................. 10-2017-0075718

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ............. F16H 3/66; F16H 2200/0069; F16H 2200/2046; F16H 2200/2012
See application file for complete search history.

(56) References Cited

U.S. PATENT DOCUMENTS

| 2016/0333979 | A1* | 11/2016 | Cho | F16H 3/66 |
| 2017/0074357 | A1* | 3/2017 | Kwon | F16H 3/66 |
| 2017/0268615 | A1* | 9/2017 | Kook | F16H 3/66 |
| 2017/0268625 | A1* | 9/2017 | Kook | F16H 3/66 |
| 2017/0268631 | A1* | 9/2017 | Kook | F16H 3/66 |
| 2017/0268632 | A1* | 9/2017 | Kook | F16H 3/66 |
| 2018/0017136 | A1* | 1/2018 | Kim | F16H 3/66 |
| 2018/0306279 | A1* | 10/2018 | Kook | F16H 3/66 |
| 2018/0363731 | A1* | 12/2018 | Kook | F16H 3/66 |

FOREIGN PATENT DOCUMENTS

KR  2013-0003981 A  1/2013

* cited by examiner

*Primary Examiner* — David J Hlavka
(74) *Attorney, Agent, or Firm* — Mintz Levin Cohn Ferris Glovsky and Popeo, P.C.; Peter F. Corless

(57) ABSTRACT

A multi-stage transmission for a vehicle is provided. The multi-stage transmission includes an input shaft and an output shaft. A first planetary gear set, a second planetary gear set, a third planetary gear set, and a fourth planetary gear set each have three rotary elements and transmit torque between the input shaft and the output shaft. At least six shifting elements are connected with the rotary elements of the planetary gear sets. Accordingly, fuel efficiency is improved by implementing multi-stages in an automatic transmission and vehicle driving comfort is improved by using operating points in a low RPM range of an engine.

14 Claims, 6 Drawing Sheets

FIG. 2

| SHIFT STAGE | CL1 | B1 | B2 | CL2 | CL3 | CL4 | GEAR RATIO |
|---|---|---|---|---|---|---|---|
| 1 | ● | ● | ● | | | ● | 5.100 |
| 2 | | ● | ● | | ● | ● | 3.138 |
| 3 | ● | ● | | | ● | ● | 2.349 |
| 4 | | ● | | ● | ● | ● | 1.962 |
| 5 | ● | ● | | ● | ● | | 1.650 |
| 6 | ● | ● | | ● | | ● | 1.320 |
| 7 | ● | | | ● | ● | ● | 1.000 |
| 8 | ● | | ● | ● | | ● | 0.857 |
| 9 | ● | | ● | ● | ● | | 0.666 |
| 10 | | | ● | ● | ● | ● | 0.615 |
| R1 | | ● | ● | ● | | ● | −6.277 |

FIG. 4

| SHIFT STAGE | CL1 | B1 | B2 | CL2 | CL3 | CL4 | GEAR RATIO |
|---|---|---|---|---|---|---|---|
| 1 | ● | ● | ● | | | ● | 5.100 |
| 2 | | ● | ● | | ● | ● | 3.060 |
| 3 | ● | ● | | | ● | ● | 2.155 |
| 4 | | ● | | ● | ● | ● | 1.800 |
| 5 | ● | ● | | ● | ● | | 1.556 |
| 6 | ● | ● | | ● | | ● | 1.304 |
| 7 | ● | | | ● | ● | ● | 1.000 |
| 8 | ● | | ● | ● | | ● | 0.829 |
| 9 | ● | | ● | ● | ● | | 0.651 |
| 10 | | | ● | ● | ● | ● | 0.600 |
| R1 | | ● | ● | ● | | ● | −4.896 |

FIG. 6

| SHIFT STAGE | CL1 | B1 | B2 | CL2 | CL3 | CL4 | GEAR RATIO |
|---|---|---|---|---|---|---|---|
| 1 | ● | ● | ● | | | ● | 5.100 |
| 2 | | ● | ● | ● | | ● | 3.060 |
| 3 | ● | ● | | ● | | ● | 2.155 |
| 4 | | ● | | ● | ● | ● | 1.800 |
| 5 | ● | ● | | ● | ● | | 1.556 |
| 6 | ● | ● | | | ● | ● | 1.273 |
| 7 | ● | | | ● | ● | ● | 1.000 |
| 8 | ● | | ● | | ● | ● | 0.848 |
| 9 | ● | | ● | ● | ● | | 0.651 |
| 10 | | | ● | ● | ● | ● | 0.600 |
| R1 | | ● | ● | | ● | ● | −6.120 |

MULTI-STAGE TRANSMISSION FOR VEHICLE

CROSS REFERENCE TO RELATED APPLICATION

The present application claims priority to Korean Patent Application No. 10-2017-0075718, filed on Jun. 15, 2017, the entire contents of which is incorporated herein for all purposes by this reference.

BACKGROUND

1. Field of the Disclosure

The present disclosure relates to a multi-stage transmission for a vehicle and more particularly, to a multi-stage transmission for a vehicle that improves fuel efficiency of a vehicle by implementing a plurality of shift stages using a reduced number of components and a simplified configuration.

2. Description of the Related Art

Recently, a rise in the oil price has caused vehicle manufacturers to seek enhancement in fuel efficiency and especially for improved engine efficiency. Accordingly, vehicle manufactures have attempted to reduce the weight of the vehicle to thereby improve the fuel efficiency. A method of operating an engine in a more efficient operating range by increasing the shift stages of a transmission thereby improves the fuel efficiency through a transmission in a vehicle. Increasing the shift stages of a transmission allows operation of an engine in a relatively lower range of revolutions per minute (RPM) to enable a vehicle to be driven more quietly.

However, as the shift stages of a transmission increase, the number of components in the transmission increases and the manufacturing costs and vehicle weight increase, and the power transmission efficiency decreases. Accordingly, transmission design requires a structure capable of achieving the maximum efficiency with a reduced component count and a simplified configuration to maximize the enhancement of fuel efficiency by multi-staging of the transmission.

The description provided above as a related art of the present disclosure is merely for enhancement of understanding of the background of the present disclosure and should not be construed as being included in the related art known by those skilled in the art.

SUMMARY

The present disclosure provides a multi-stage transmission for a vehicle that may improve fuel efficiency of a vehicle by implementing a plurality of shift stages using a minimal number of parts and simplified configuration.

In an aspect of an exemplary embodiment of the present disclosure, a multi-stage transmission for a vehicle may include an input shaft and an output shaft; a first planetary gear set, a second planetary gear set, a third planetary gear set, and a fourth planetary gear set that each have three rotary elements and are configured to transmit torque between the input shaft and the output shaft and six shifting elements connected with the rotary elements of the planetary gear sets. In particular, a first rotary element of the first planetary gear set may be fixed with respect to a transmission case by a first brake of the shifting elements, a second rotary element may be connected with a third rotary element of the fourth planetary gear set, and a third rotary element may be connected with a first rotary element of the second planetary gear set and may be fixed with respect to the transmission case by a second brake of the shifting elements. Additionally, a second rotary element of the second planetary gear set may be fixedly connected with the input shaft and may be selectively connected with a first rotary element of the fourth planetary gear set through a first clutch of the shifting elements, and a second rotary element of the fourth planetary gear set may be fixedly connected with the output shaft.

In some exemplary embodiments, a third rotary element of the second planetary gear set may be connected with a third rotary element of the third planetary gear set and selectively connected with a second rotary element of the third planetary gear set. A first rotary element of the third planetary gear set may be selectively connected with the first rotary element of the fourth planetary gear set, and the second rotary element of the third planetary gear set may be selectively connected with the second rotary element of the first planetary gear set. Additionally, the remaining plurality of the shifting elements may be provided to selectively connect the rotary elements of the planetary gear sets.

In other exemplary embodiments, a second clutch of the shifting elements may form a removable connection structure between the second rotary element of the first planetary gear set and the second rotary element of the third planetary gear set. A third clutch of the shifting elements may form a removable connection structure between the third rotary element of the second planetary gear set and the second rotary element of the third planetary gear set. A fourth clutch of the shifting elements may form a removable connection structure between the first rotary element of the third planetary gear set and the first rotary element of the fourth planetary gear set.

Additionally, the third rotary element of the second planetary gear set may be connected with the first rotary element of the third planetary gear set and selectively connected with the second rotary element of the third planetary gear set. The second rotary element of the first planetary gear set may be selectively connected with the second rotary element of the third planetary gear set, and the third rotary element of the third planetary gear set may be selectively connected with the first rotary element of the fourth planetary gear set. The remaining plurality the shifting elements may be provided to selectively connect the rotary elements of the planetary gear sets.

In other exemplary embodiments, a second clutch of the shifting elements may form a removable connection structure between the second rotary element of the first planetary gear set and the second rotary element of the third planetary gear set. A third clutch of the shifting elements may form a removable connection structure between the third rotary element of the second planetary gear set and the second rotary element of the third planetary gear set. A fourth clutch of the shifting elements may form a removable connection structure between the third rotary element of the third planetary gear set and the first rotary element of the fourth planetary gear set.

In some exemplary embodiments, the second rotary element of the first planetary gear set may be fixedly connected with a second rotary element of the third planetary gear set. A third rotary element of the second planetary gear set may be selectively connected with a first rotary element of the third planetary gear set. The third rotary element of the second planetary gear set may be selectively connected with a third rotary element of the third planetary gear set. Additionally, the first rotary element of the third planetary gear set may be selectively connected with the first rotary element of the fourth planetary gear set.

Further, a second clutch of the shifting elements may form a removable connection structure between the third rotary element of the second planetary gear set and the first rotary element of the third planetary gear set. A third clutch of the shifting elements may form a removable connection structure between the third rotary element of the second planetary gear set and the third rotary element of the third planetary gear set. A fourth clutch of the shifting elements may form a removable connection structure between the first rotary element of the third planetary gear set and the first rotary element of the fourth planetary gear set.

In another aspect of an exemplary embodiment of the present disclosure, a multi-stage transmission for a vehicle may include a first planetary gear set, a second planetary gear set, a third planetary gear set, and a fourth planetary gear set that each have three rotary elements, six shifting elements configured to provide a variable friction force, and nine rotary shafts connected with the rotary elements of the planetary gear sets. A first rotary shaft may be an input shaft directly connected to a second rotary element of the second planetary gear set. A second rotary shaft may be directly connected to a first rotary element of the first planetary gear set. A third rotary shaft may be directly connected to a second rotary element of the first planetary gear set and a third rotary element of the fourth planetary gear set.

A fourth rotary shaft may be directly connected to a third rotary element of the first planetary gear set and a first rotary element of the second planetary gear set. A fifth rotary shaft may be directly connected to a first rotary element of the fourth planetary gear set. A sixth rotary shaft may be an output shaft directly connected to a second rotary element of the fourth planetary gear set. Additionally, in the six shifting elements a first clutch may be disposed between the first rotary shaft and the fifth rotary shaft. A first brake may be disposed between the second rotary shaft and a transmission case, and a second brake may be disposed between the fourth rotary shaft and the transmission case.

In some exemplary embodiments, seventh rotary shaft may be directly connected to a third rotary element of the second planetary gear set and a third rotary element of the third planetary gear set. An eighth rotary shaft may be directly connected to a second rotary element of the third planetary gear set. A ninth rotary shaft may be directly connected to a first rotary element of the third planetary gear set. Additionally, in the six shifting elements, a second clutch may be disposed between the third rotary shaft and the eighth rotary shaft, a third clutch may be disposed between the seventh rotary shaft and the eighth rotary shaft, and a fourth clutch may be disposed between the fifth rotary shaft and the ninth rotary shaft.

The first clutch may selectively connect the input shaft and the first rotary element of the fourth planetary gear set. The second clutch may selectively connect the second rotary element of the first planetary gear set and the second rotary element of the third planetary gear set. The third clutch may selectively connect the third rotary element of the second planetary gear set and the second rotary element of the third planetary gear set. The fourth clutch may selectively connect the first rotary element of the third planetary gear set and the first rotary element of the fourth planetary gear set.

In other exemplary embodiments, a seventh rotary shaft may be directly connected with a third rotary element of the second planetary gear set and a first rotary element of the third planetary gear set. An eighth rotary shaft may be directly connected with a second rotary element of the third planetary gear set. A ninth rotary shaft may be directly connected with a third rotary element of the third planetary gear set. Additionally, in the six shifting elements, a second clutch may be disposed between the third rotary shaft and the eighth rotary shaft, a third clutch may be disposed between the seventh rotary shaft and the eighth rotary shaft, and a fourth clutch may be disposed between the fifth rotary shaft and the ninth rotary shaft.

The first clutch may selectively connect the input shaft and the first rotary element of the fourth planetary gear set. The second clutch may selectively connect the second rotary element of the first planetary gear set and the second rotary element of the third planetary gear set. The third clutch may selectively connect the third rotary element of the second planetary gear set and the second rotary element of the third planetary gear set. The fourth clutch may selectively connect the third rotary element of the third planetary gear set and the first rotary element of the fourth planetary gear set.

In some exemplary embodiments, the third rotary shaft may be directly connected with the second rotary element of the third planetary gear set. A seventh rotary shaft may be directly connected to a third rotary element of the second planetary gear set. An eighth rotary shaft may be directly connected to a first rotary element of the third planetary gear set. A ninth rotary shaft may be directly connected to a third rotary element of the third planetary gear set. Additionally, in the six shifting elements, a second clutch may be disposed between the seventh rotary shaft and the eighth rotary shaft, a third clutch may be disposed between the seventh rotary shaft and the ninth rotary shaft, and a fourth clutch may be disposed between the fifth rotary shaft and the eighth rotary shaft.

Further, the first clutch may selectively connect the input shaft and the first rotary element of the fourth planetary gear set. The second clutch may selectively connect the third rotary element of the second planetary gear set and the first rotary element of the third planetary gear set. The third clutch may selectively connect the third rotary element of the second planetary gear set and the third rotary element of the third planetary gear set. The fourth clutch may selectively connect the first rotary element of the third planetary gear set and the first rotary element of the fourth planetary gear set.

BRIEF DESCRIPTION OF THE DRAWINGS

FIG. 2 is an exemplary table showing operation at each shift stage of the multi-stage transmission for a vehicle according to the first exemplary embodiment of the present disclosure;

FIG. 4 is an exemplary table showing operation at each shift stage of the multi-stage transmission for a vehicle according to the second exemplary embodiment of the present disclosure;

FIG. 6 is an exemplary table showing operation at each shift stage of the multi-stage transmission for a vehicle according to the third exemplary embodiment of the present disclosure.

DETAILED DESCRIPTION

Hereinafter, an exemplary embodiment of the present disclosure will be described in detail with reference to the accompanying drawings. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
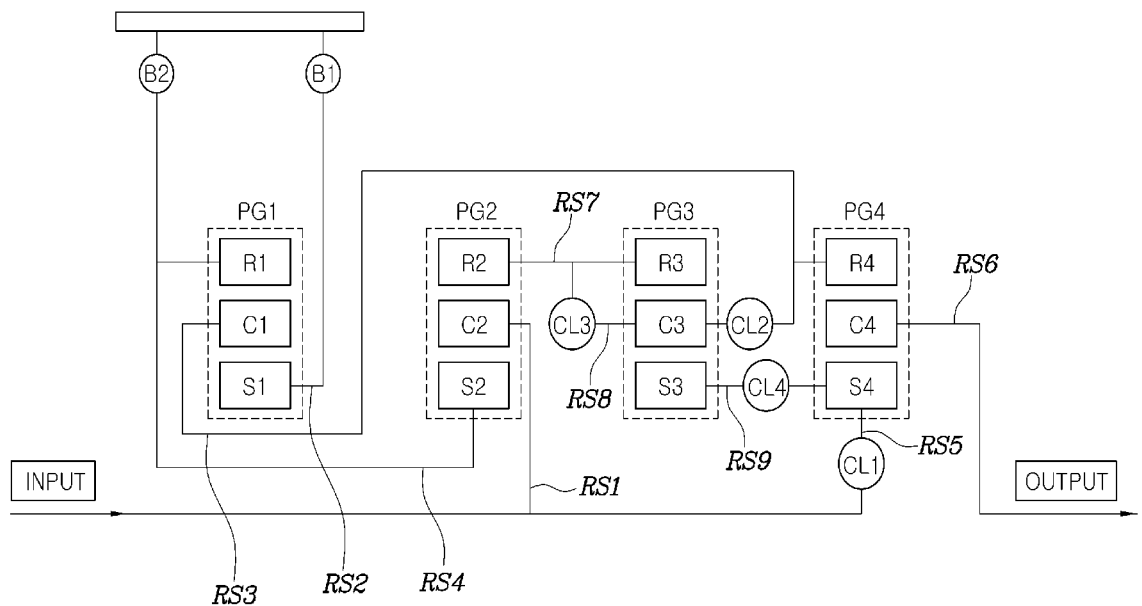
FIG. 1 is an exemplary diagram schematically showing the structure of a multi-stage transmission for a vehicle according to a first exemplary embodiment of the present disclosure.

Hereinafter, multi-stage transmissions for a vehicle according to exemplary embodiments of the present disclosure will be described with reference to the accompanying drawings. FIG. 1 is an exemplary diagram schematically showing the structure of a multi-stage transmission for a vehicle according to a first exemplary embodiment of the present disclosure. Referring to FIG. 1, a multi-stage transmission for a vehicle may include an input shaft INPUT and an output shaft OUTPUT, a first planetary gear set PG1, a second planetary gear set PG2, a third planetary gear set PG3, and a fourth planetary gear set PG4 that each have three rotary elements and are configured to transmit torque between the input shaft INPUT and the output shaft OUTPUT, and six shifting elements connected to the rotary elements of the planetary gear sets.

In the first planetary gear set PG1, a first rotary element S1 may be fixed with respect to a transmission case by a first brake B1 of the shifting elements. A second rotary element C1 may be connected with a third rotary element R4 of the fourth planetary gear set PG4, and a third rotary element R1 may be connected with a first rotary element S2 of the second planetary gear set PG2 and may be fixed with respect to the transmission case by a second brake B2 of the shifting elements.

A second rotary element C2 of the second planetary gear set PG2 may be fixedly connected with the input shaft INPUT and may be selectively connected with a first rotary element S4 of the fourth planetary gear set PG4 through a first clutch CL1 of the shifting elements. A second rotary element C4 of the fourth planetary gear set PG4 may be fixedly connected with the output shaft OUTPUT. In particular, when the first, second, third, and fourth planetary gear sets are connected between the input shaft INPUT configured to input power and the output shaft OUTPUT configured to output power, a multi-stage operation may be achieved.

For example, the first brake B1 and the second brake B2 respectively stop or allow for rotation of the first rotary element S1 and the third rotary element R1 of the first planetary gear set PG1. In the present disclosure, the first planetary gear set PG1, the second planetary gear set PG2, the third planetary gear set PG3, and the fourth planetary gear set PG4 may be sequentially arranged in an axial direction of the input shaft INPUT and the output shaft OUTPUT.

The first rotary element S1, the second rotary element C1, and the third rotary element R1 of the first planetary gear set PG1 may be a first sun gear, a first carrier, and a first ring gear, respectively. The first rotary element S2, the second rotary element C2, and the third rotary element R2 of the second planetary gear set PG2 may be a second sun gear, a second carrier, and a second ring gear, respectively. The first rotary element S3, the second rotary element C3, and the third rotary element R3 of the third planetary gear set PG3 may be a third sun gear, a third carrier, and a third ring gear, respectively. The first rotary element S4, the second rotary element C4, and the third rotary element R4 of the fourth planetary gear set PG4 may be a fourth sun gear, a fourth carrier, and a fourth ring gear, respectively.

The multi-stage transmission may include the first planetary gear set PG1, the second planetary gear set PG2, the third planetary gear set PG3, and the fourth planetary gear set PG4 that each have three rotary elements, six shifting elements configured to provide a variable friction force, and nine rotary shafts connected with the rotary elements of the planetary gear sets. In particular, a first rotary shaft RS1 may be the input shaft INPUT directly connected to the second rotary element C2 of the second planetary gear set PG2. A second rotary shaft RS2 may be directly connected to the first rotary element S1 of the first planetary gear set PG1. A third rotary shaft RS3 may be directly connected to the second rotary element C1 of the first planetary gear set PG1 and the third rotary element R4 of the fourth planetary gear set PG4.

A fourth rotary shaft RS4 may be directly connected to the third rotary element R1 of the first planetary gear set PG1 and the first rotary element S2 of the second planetary gear set PG2. A fifth rotary shaft RS5 may be directly connected to the first rotary element S4 of the fourth planetary gear set PG4. A sixth rotary shaft RS6 may be the output shaft OUTPUT directly connected to the second rotary element C4 of the fourth planetary gear set PG4. Further, the first clutch CL1 of the six shifting elements may be disposed between the first rotary shaft RS1 and the fifth rotary shaft RS5. The first brake B1 may be disposed between the second rotary shaft RS2 and the transmission case, and the second brake B2 may be disposed between the fourth rotary shaft RS4 and the transmission case.

In particular, the multi-stage transmission for a vehicle of the present disclosure may be implemented in various exemplary embodiments. In the multi-stage transmission for a vehicle according a first exemplary embodiment, the third rotary element R2 of the second planetary gear set PG2 may be connected with the third rotary element R3 of the third planetary gear set PG3 and selectively connected with the second rotary element C2 of the third planetary gear set PG3. The first rotary element S3 of the third planetary gear set PG3 may be selectively connected with the first rotary element S4 of the fourth planetary gear set PG4. The second rotary element C3 of the third planetary gear set PG3 may be selectively connected with the second rotary element C1 of the first planetary gear set PG1. Additionally, the plurality of the remaining shifting elements may be provided to selectively connect the rotary elements of the planetary gear sets.

In particular, the second clutch CL2 of the shifting elements may form a removable connection structure between the second rotary element C1 of the first planetary gear set PG1 and the second rotary element C3 of the third planetary gear set PG3. The third clutch CL3 of the shifting elements may form a removable connection structure between the third rotary element R2 of the second planetary gear set PG2 and the second rotary element C3 of the third planetary gear set PG3. The fourth clutch CL4 of the shifting elements may form a removable connection structure between the first rotary element S3 of the third planetary gear set PG3 and the first rotary element S4 of the fourth planetary gear set PG4.

In the first exemplary embodiment, a seventh rotary shaft RS7 may be directly connected with the third rotary element R2 of the second planetary gear set PG2 and the third rotary element R3 of the third planetary gear set PG3. An eighth rotary shaft RS8 may be directly connected with the second rotary element C3 of the third planetary gear set PG3. A ninth rotary shaft RS9 may be directly connected with the first rotary element S3 of the third planetary gear set PG3. Further, in the six shifting elements, the second clutch CL2 may be disposed between the third rotary shaft RS3 and the eighth rotary shaft RS8, the third clutch CL3 may be disposed between the seventh rotary shaft RS7 and the eighth rotary shaft RS8. The fourth clutch CL4 may be disposed between the fifth rotary shaft RS5 and the ninth rotary shaft RS9.

The first clutch CL1 may selectively connect the input shaft INPUT and the first rotary element S4 of the fourth planetary gear set PG4. The second clutch CL2 may selectively connect the second rotary element C1 of the first planetary gear set PG1 and the second rotary element C3 of the third planetary gear set PG3. The third clutch CL3 may selectively connect the third rotary element R2 of the second planetary gear set PG2 and the second rotary element C3 of the third planetary gear set PG3. The fourth clutch CL4 may selectively connect the first rotary element S3 of the third planetary gear set PG3 and the first rotary element S4 of the fourth planetary gear set PG4.

FIG. 2 is an exemplary table showing operation at each shift stage of the multi-stage transmission for a vehicle according to the first exemplary embodiment of the present disclosure. Referring to FIG. 2, the multi-stage transmission for a vehicle which includes the four planetary gear sets and six shifting elements may implement ten forward stages and one rearward stage.

Figure 3:
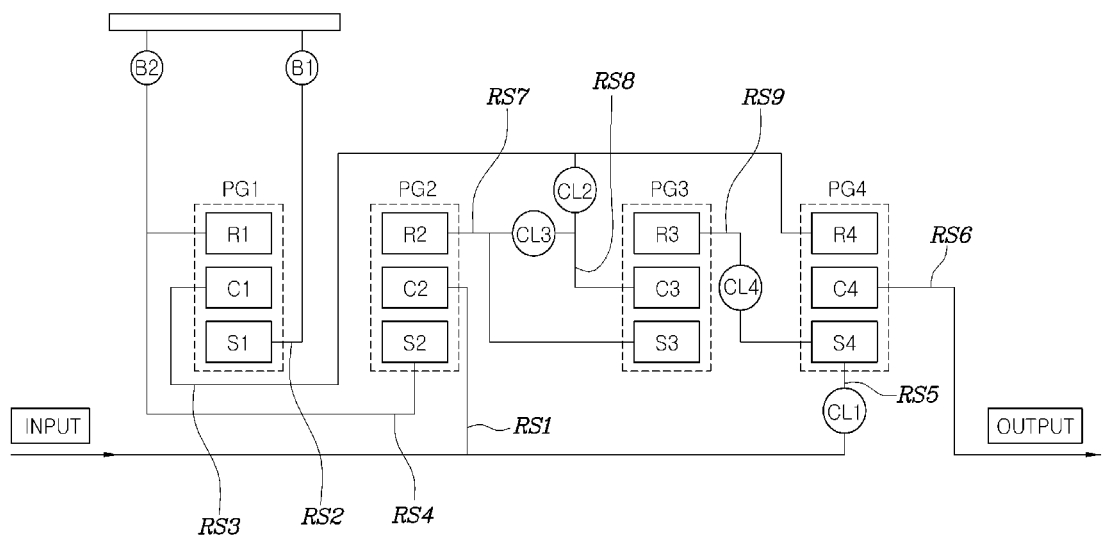
FIG. 3 is an exemplary diagram schematically showing the structure of a multi-stage transmission for a vehicle according to a second exemplary embodiment of the present disclosure.

FIG. 3 is an exemplary diagram schematically showing the structure of a multi-stage transmission for a vehicle according to a second exemplary embodiment of the present disclosure. Referring to FIG. 3 showing a multi-stage transmission for a vehicle according to a second exemplary embodiment of the present disclosure, the third rotary element R2 of the second planetary gear set PG2 may be connected with the first rotary element S3 of the third planetary gear set PG3 and selectively connected with the second rotary element C3 of the third planetary gear set PG3. The second rotary element C1 of the first planetary gear set PG1 may be selectively connected with the second rotary element C3 of the third planetary gear set PG3. The third rotary element R3 of the third planetary gear set PG3 may be selectively connected with the first rotary element S4 of the fourth planetary gear set PG4. Additionally, the plurality of the remaining shifting elements may be provided to selectively connect the rotary elements of the planetary gear sets.

The second clutch CL2 of the shifting elements may form a removable connection structure between the second rotary element C1 of the first planetary gear set PG1 and the second rotary element C3 of the third planetary gear set PG3. The third clutch CL3 of the shifting elements may form a removable connection structure between the third rotary element R2 of the second planetary gear set PG2 and the second rotary element C3 of the third planetary gear set PG3. The fourth clutch CL4 of the shifting elements may form a removable connection structure between the third rotary element R3 of the third planetary gear set PG3 and the first rotary element S4 of the fourth planetary gear set PG4.

In other words, in the second exemplary embodiment, the seventh rotary shaft RS7 may be directly connected with the third rotary element R2 of the second planetary gear set PG2 and the first rotary element S3 of the third planetary gear set PG1. The eighth rotary shaft RS8 may be directly connected with the second rotary element C3 of the third planetary gear set PG3. The ninth rotary shaft RS9 may be directly connected with the third rotary element R3 of the third planetary gear set PG3. Further, in the six shifting elements, the second clutch CL2 may be disposed between the third rotary shaft RS3 and the eighth rotary shaft RS8. The third clutch CL3 may be disposed between the seventh rotary shaft RS7 and the eighth rotary shaft RS8. The fourth clutch CL4 may be disposed between the fifth rotary shaft RS5 and the ninth rotary shaft RS9.

The first clutch CL1 may selectively connect the input shaft INPUT and the first rotary element S4 of the fourth planetary gear set PG4. The second clutch CL2 may selectively connect the second rotary element C1 of the first planetary gear set PG1 and the second rotary element C3 of the third planetary gear set PG3. The third clutch CL3 may selectively connect the third rotary element R2 of the second planetary gear set PG2 and the second rotary element C3 of the third planetary gear set PG3. The fourth clutch CL4 may selectively connect the third rotary element R3 of the third planetary gear set PG3 and the first rotary element S4 of the fourth planetary gear set PG4.

FIG. 4 is an exemplary table showing operation at each shift stage of the multi-stage transmission for a vehicle according to the second exemplary embodiment of the present disclosure. Referring to FIG. 4 the multi-stage transmission for a vehicle which includes the four planetary gear sets and six shifting elements may implement ten forward stages and one rearward stage.

Figure 5:
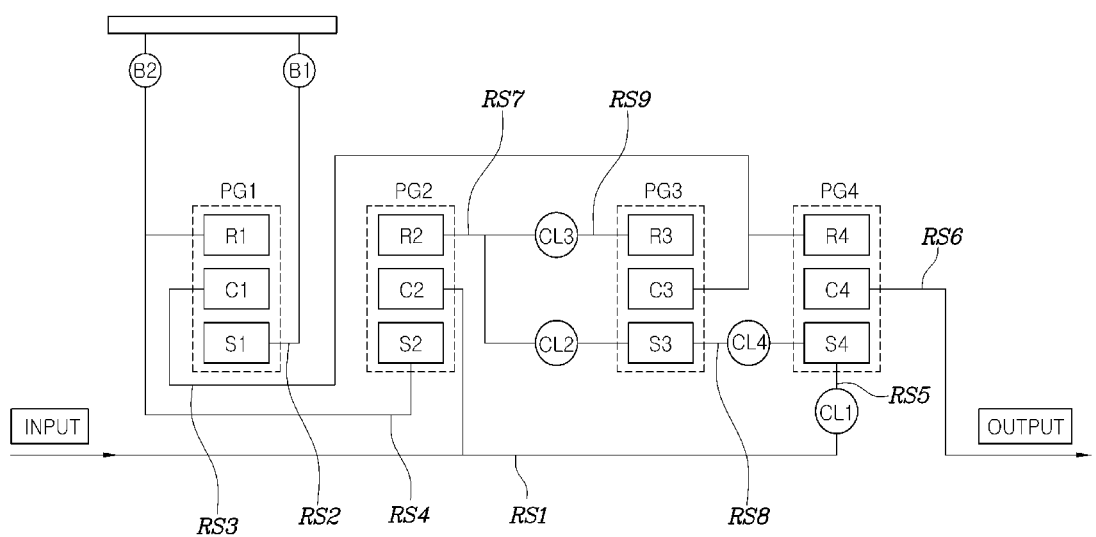
FIG. 5 is an exemplary diagram schematically showing the structure of a multi-stage transmission for a vehicle according to a third exemplary embodiment of the present disclosure.

FIG. 5 is an exemplary diagram schematically showing the structure of a multi-stage transmission for a vehicle according to a third exemplary embodiment of the present disclosure. Referring to FIG. 5 showing a multi-stage transmission for a vehicle according to a third exemplary embodiment, the second rotary element C1 of the first planetary gear set PG1 may be fixedly connected with the second rotary element C3 of the third planetary gear set PG3. The third rotary element R2 of the second planetary gear set PG2 may be selectively connected with the first rotary element S3 of the third planetary gear set PG3. The third rotary element R2 of the second planetary gear set PG2 may be selectively connected with the third rotary element R3 of the third planetary gear set PG3. The first rotary element S3 of the third planetary gear set PG3 may be selectively connected with the first rotary element S4 of the fourth planetary gear set PG4.

The second clutch CL2 of the shifting elements may form a removable connection structure between the third rotary element R2 of the second planetary gear set PG2 and the first rotary element S3 of the third planetary gear set PG3. The third clutch CL3 of the shifting elements may form a removable connection structure between the third rotary element R2 of the second planetary gear set PG2 and the third rotary element R3 of the third planetary gear set PG3. The fourth clutch CL4 of the shifting elements may form a removable connection structure between the first rotary element S3 of the third planetary gear set PG3 and the first rotary element S4 of the fourth planetary gear set PG4.

In other words, in the third exemplary embodiment, the third rotary shaft RS3 may be directly connected with the second rotary element C3 of the third planetary gear set PG3. The seventh rotary shaft RS7 may be directly connected to the third rotary element R2 of the second planetary gear set PG2. The eighth rotary shaft RS8 may be directly connected to the first rotary element S3 of the third planetary gear set PG3. The ninth rotary shaft RS9 may be directly connected to the third rotary element R3 of the third planetary gear set PG3. Further, in the six shifting elements, the second clutch CL2 may be disposed between the seventh rotary shaft RS7 and the eighth rotary shaft RS8. The third clutch CL3 may be disposed between the seventh rotary shaft RS7 and the ninth rotary shaft RS9. The fourth clutch CL4 may be disposed between the fifth rotary shaft RS5 and the eighth rotary shaft RS8.

The first clutch CL1 may selectively connect the input shaft INPUT and the first rotary element S4 of the fourth planetary gear set PG4. The second clutch CL2 may selectively connect the third rotary element R2 of the second planetary gear set PG2 and the first rotary element S3 of the third planetary gear set PG3. The third clutch CL3 may selectively connect the third rotary element R2 of the second planetary gear set PG2 and the third rotary element R3 of the third planetary gear set PG3. The fourth clutch CL4 may connect the first rotary element S3 of the third planetary gear set PG3 and the first rotary element S4 of the fourth planetary gear set PG4.

FIG. 6 is an exemplary table showing operation at each shift stage of the multi-stage transmission for a vehicle according to the third exemplary embodiment of the present disclosure. Referring to FIG. 6 the multi-stage transmission for a vehicle including the four planetary gear sets and six shifting elements may implement ten forward stages and one rearward stage by such a shifting operation.

According to the multi-stage transmissions for a vehicle which has the structures described above, since the rotary elements of four planetary gear sets are selectively connected or disconnected by clutches and brakes, their rotational speeds and directions may be adjusted and shifting may be performed based on the adjustment. Therefore, a vehicle may be driven with the gear ratios of ten forward stages and one rearward stage. Therefore, fuel efficiency may be improved by implementing multi-stage in an automatic transmission and may improve vehicle driving comfort by using operating points in a low RPM range of an engine.

Although the present disclosure was described with reference to specific exemplary embodiments shown in the drawings, it is apparent to those skilled in the art that the present disclosure may be changed and modified in various ways without departing from the scope of the present disclosure, which is described in the following claims.

What is claimed is:

1. A multi-stage transmission for a vehicle, comprising:
   an input shaft and an output shaft;
   a first planetary gear set, a second planetary gear set, a third planetary gear set, and a fourth planetary gear set that each have three rotary elements and are configured to transmit torque between the input shaft and the output shaft; and
   at least six shifting elements, each connected with the rotary elements of the planetary gear sets, wherein the at least six shifting elements include clutches and brakes,
   wherein a first rotary element of the first planetary gear set is selectively fixed to a transmission case by a first brake of the shifting elements, a second rotary element is fixedly connected with a third rotary element of the fourth planetary gear set, and a third rotary element is fixedly connected to a first rotary element of the second planetary gear set and is selectively fixed to the transmission case by a second brake of the shifting elements, and
   wherein a second rotary element of the second planetary gear set is fixedly connected to the input shaft and is selectively connected to a first rotary element of the fourth planetary gear set through a first clutch of the shifting elements, and a second rotary element of the fourth planetary gear set is fixedly connected to the output shaft.

2. The multi-stage transmission of claim 1, wherein:
   a third rotary element of the second planetary gear set is fixedly connected to a third rotary element of the third planetary gear set and selectively connected to a second rotary element of the third planetary gear set,
   a first rotary element of the third planetary gear set is selectively connected to the first rotary element of the fourth planetary gear set,
   the second rotary element of the third planetary gear set is selectively connected to the second rotary element of the first planetary gear set.

3. The multi-stage transmission of claim 2, wherein:
   a second clutch of the shifting elements is disposed between the second rotary element of the first planetary gear set and the second rotary element of the third planetary gear set,
   wherein a third clutch of the shifting elements is disposed between the third rotary element of the second planetary gear set and the second rotary element of the third planetary gear set, and
   wherein a fourth clutch of the shifting elements is disposed between the first rotary element of the third planetary gear set and the first rotary element of the fourth planetary gear set.

4. The multi-stage transmission of claim 1, wherein:
   a third rotary element of the second planetary gear set is connected to the first rotary element of the third planetary gear set and selectively connected to a second rotary element of the third planetary gear set, the second rotary element of the first planetary gear set is selectively connected to the second rotary element of the third planetary gear set, a third rotary element of the third planetary gear set is selectively connected to the first rotary element of the fourth planetary gear set.

5. The multi-stage transmission of claim 4, wherein:

a second clutch of the shifting elements is disposed between the second rotary element of the first planetary gear set and the second rotary element of the third planetary gear set, a third clutch of the shifting elements is disposed between the third rotary element of the second planetary gear set and the second rotary element of the third planetary gear set, and a fourth clutch of the shifting elements is disposed between the third rotary element of the third planetary gear set and the first rotary element of the fourth planetary gear set.

6. The multi-stage transmission of claim 1, wherein:

the second rotary element of the first planetary gear set is fixedly connected to a second rotary element of the third planetary gear set, a third rotary element of the second planetary gear set is selectively connected to a first rotary element of the third planetary gear set, the third rotary element of the second planetary gear set is selectively connected to a third rotary element of the third planetary gear set, the first rotary element of the third planetary gear set is selectively connected to the first rotary element of the fourth planetary gear set.

7. The multi-stage transmission of claim 6, wherein:

a second clutch of the shifting elements is disposed between the third rotary element of the second planetary gear set and the first rotary element of the third planetary gear set, a third clutch of the shifting elements is disposed between the third rotary element of the second planetary gear set and the third rotary element of the third planetary gear set, and a fourth clutch of the shifting elements is disposed between the first rotary element of the third planetary gear set and the first rotary element of the fourth planetary gear set.

8. A multi-stage transmission for a vehicle, comprising:

a first planetary gear set, a second planetary gear set, a third planetary gear set, and a fourth planetary gear set that each have three rotary elements;

six shifting elements, each configured to selectively provide a friction force, wherein the six shifting elements include clutches and brakes; and nine rotary shafts, each connected with the rotary elements of the planetary gear sets, wherein a first rotary shaft is an input shaft directly connected to a second rotary element of the second planetary gear set, a second rotary shaft is directly connected to a first rotary element of the first planetary gear set, a third rotary shaft is directly connected to a second rotary element of the first planetary gear set and a third rotary element of the fourth planetary gear set, a fourth rotary shaft is directly connected to a third rotary element of the first planetary gear set and a first rotary element of the second planetary gear set, a fifth rotary shaft is directly connected to a first rotary element of the fourth planetary gear set, a sixth rotary shaft is an output shaft directly connected to a second rotary element of the fourth planetary gear set, and wherein in the six shifting elements, a first clutch is disposed between the first rotary shaft and the fifth rotary shaft, a first brake is disposed between the second rotary shaft and a transmission case, and a second brake is disposed between the fourth rotary shaft and the transmission case.

9. The multi-stage transmission of claim 8, wherein:

a seventh rotary shaft is directly connected to a third rotary element of the second planetary gear set and a third rotary element of the third planetary gear set, an eighth rotary shaft is directly connected to a second rotary element of the third planetary gear set, a ninth rotary shaft is directly connected to a first rotary element of the third planetary gear set, and in the six shifting elements, a second clutch is disposed between the third rotary shaft and the eighth rotary shaft, a third clutch is disposed between the seventh rotary shaft and the eighth rotary shaft, and a fourth clutch is disposed between the fifth rotary shaft and the ninth rotary shaft.

10. The multi-stage transmission of claim 9, wherein:

the first clutch selectively connects the input shaft and the first rotary element of the fourth planetary gear set, the second clutch selectively connects the second rotary element of the first planetary gear set and the second rotary element of the third planetary gear set, the third clutch selectively connects the third rotary element of the second planetary gear set and the second rotary element of the third planetary gear set, and the fourth clutch selectively connects the first rotary element of the third planetary gear set and the first rotary element of the fourth planetary gear set.

11. The multi-stage transmission of claim 8, wherein:

a seventh rotary shaft is directly connected with a third rotary element of the second planetary gear set and a first rotary element of the third planetary gear set, an eighth rotary shaft is directly connected with a second rotary element of the third planetary gear set, a ninth rotary shaft is directly connected with a third rotary element of the third planetary gear set, and in the six shifting elements, a second clutch is disposed between the third rotary shaft and the eighth rotary shaft, a third clutch is disposed between the seventh rotary shaft and the eighth rotary shaft, and a fourth clutch is disposed between the fifth rotary shaft and the ninth rotary shaft.

12. The multi-stage transmission of claim 11, wherein:

the first clutch selectively connects the input shaft and the first rotary element of the fourth planetary gear set, the second clutch selectively connects the second rotary element of the first planetary gear set and the second rotary element of the third planetary gear set, the third clutch selectively connects the third rotary element of the second planetary gear set and the second rotary element of the third planetary gear set, and the fourth clutch selectively connects the third rotary element of the third planetary gear set and the first rotary element of the fourth planetary gear set.

13. The multi-stage transmission of claim 8, wherein:

the third rotary shaft is directly connected with a second rotary element of the third planetary gear set, a seventh rotary shaft is directly connected to a third rotary element of the second planetary gear set, an eighth rotary shaft is directly connected to a first rotary element of the third planetary gear set, a ninth rotary shaft is directly connected to a third rotary element of the third planetary gear set, and in the six shifting elements, a second clutch is disposed between the seventh rotary shaft and the eighth rotary shaft, a third clutch is disposed between the seventh rotary shaft and the ninth rotary shaft, and a fourth clutch is disposed between the fifth rotary shaft and the eighth rotary shaft.

14. The multi-stage transmission of claim 13, wherein the first clutch selectively connects the input shaft and the first rotary element of the fourth planetary gear set, the second clutch selectively connects the third rotary element of the second planetary gear set and the first rotary element of the third planetary gear set, the third clutch selectively connects the third rotary element of the second planetary gear set and the third rotary element of the third planetary gear set, and the fourth clutch selectively connects the first rotary element of the third planetary gear set and the first rotary element of the fourth planetary gear set.

* * * * *